Patented Nov. 16, 1926.

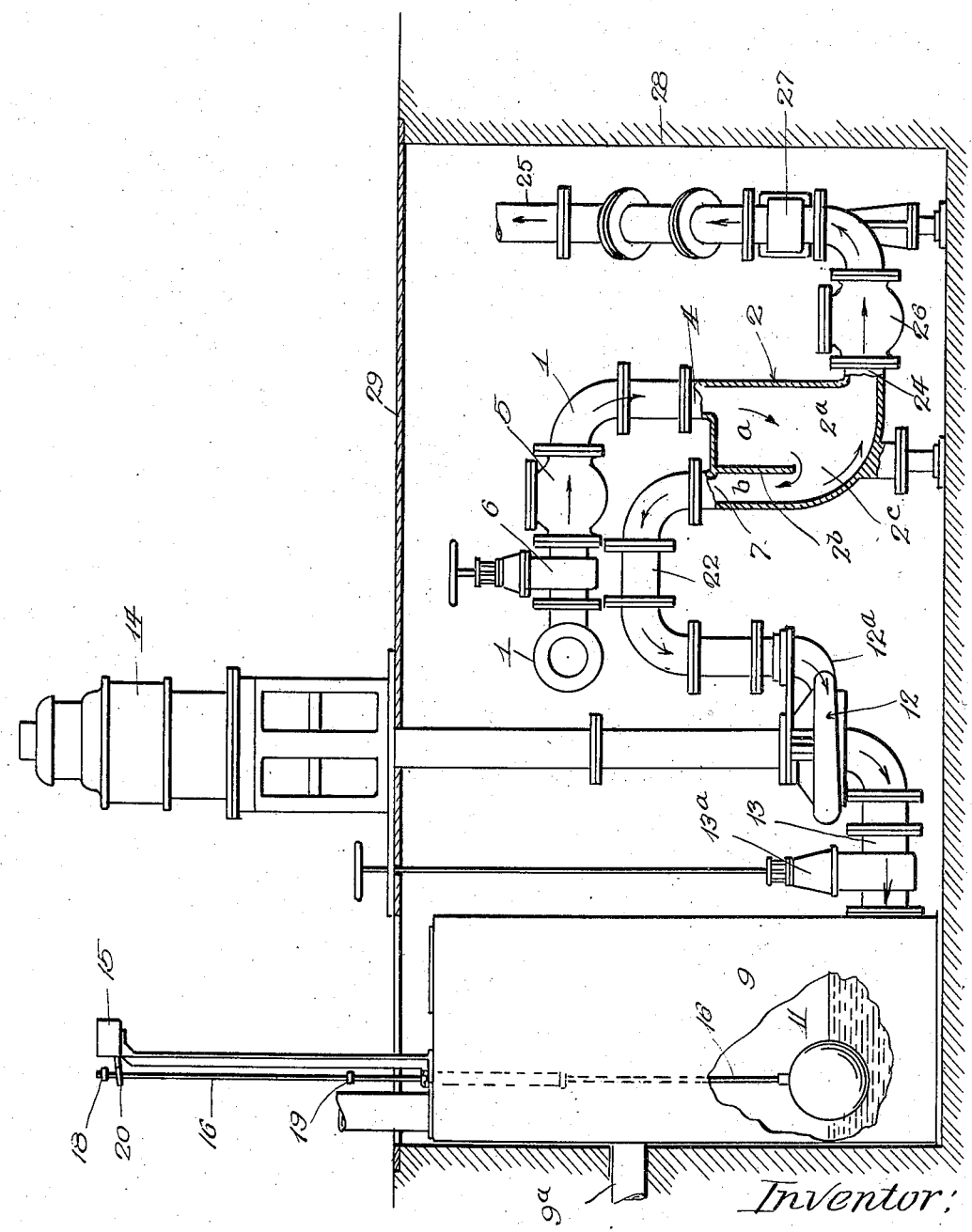

1,607,248

UNITED STATES PATENT OFFICE.

AUGUSTUS C. DURDIN, JR., OF CHICAGO, ILLINOIS, ASSIGNOR TO CHICAGO PUMP COMPANY, OF CHICAGO, ILLINOIS, A CORPORATION OF ILLINOIS.

SEWAGE-PUMPING APPARATUS.

Application filed August 2, 1926. Serial No. 126,499.

This invention relates to sewage apparatus and more particularly to apparatus for handling liquids containing more or less solid matter, and its principal object is to provide improved means for safe guarding the pump against the entrance of the more or less solid substances whereby the pump is prevented from becoming clogged or seriously injured. Another object is to simplify apparatus of this kind and to dispense with the usual screening device or screens for straining out the more or less solid substances. Another object is to provide a collection chamber for the more or less solid substances in advance of the pump and to provide automatic means for intermittently flushing out the collection chamber and thereby freeing it of the collected foreign matter.

With these and other objects and advantages in view this invention consists in a pumping apparatus embodying an intermittently operating pump and a trap or collection receptacle interposed in the inlet pipe to the pump. It further consists in the provision of a liquid receiving chamber, in combination with the pump and collection receptacle or trap and means controlled by the volume of water in the liquid receiving chamber for starting and stopping the pump. It further consists in the several novel features of construction, arrangement and combination of parts hereinafter fully set forth and claimed.

The invention is clearly illustrated in the drawing accompanying this specification, in which the figure is a view, partly in side elevation and partly in vertical section, of pumping apparatus embodying a simple form of the present invention.

Referring to said drawing, the reference character 1 designates the inlet pipe of the apparatus which is connected to the discharge pipe of the system which is to be handled. Said inlet pipe 1 connects with the inlet 4 of a trap or collection receptacle 2. In said inlet pipe 1 is a check valve 5 which opens toward the trap 2, and if desired a valve 6 may be provided in said pipe 1 whereby the apparatus may be shut off from the sewage system or other source of liquid supply.

The trap or collection receptacle 2 contains a relatively large chamber $2^a$, across the upper end of which extends a baffle or wall $2^b$ which divides the chamber $2^a$ into two passages or portions $a$, $b$, but connected through an opening $2^c$ at the lower end of the baffle or wall $2^b$ through which water or other liquid may flow. At the top of the passage $b$ is an outlet opening 7, from which leads a pipe 22 which is carried up above the top of the trap or collection receptacle 2, and said pipe 22 leads to the discharge end $12^a$ of a pump 12. The intake side of the pump is connected with a chamber 9 such as a tank or reservoir by a pipe 13. If desired a valve $13^a$ may be interposed in the pipe 13 for the purpose of shutting off the rest of the apparatus from the tank or reservoir 9. The pump 12, is intermittently operated and in its present form is connected to and operated by an electric motor 14. The motor is controlled from an electric switch 15, which is controlled by the volume of water contained in the tank or reservoir 9. In accordance with the invention as illustrated, the switch lever 20 of the switch 15 is actuated by buttons 18, 19 that are mounted on a switch actuating rod 16, which has a float 11 secured to its lower end that is raised and lowered by the water contained in the tank or reservoir. If desired an inlet pipe $9^a$ may be provided for the tank or reservoir 9 through which water, relatively free from foreign substance, may be discharged directly into the tank.

The trap or collection receptacle has a discharge outlet 24 at its lower end which connects with the discharge pipe 25 of the system, and an outwardly opening check valve 26 is interposed in said pipe, preferably at the discharge end of the trap 2. If desired a valve 27 may be interposed in the discharge pipe 25 whereby the apparatus may be shut off therefrom. Most of the apparatus is usually contained in a pit 28 which is closed by a cover 29 and said cover may furnish the support for the pump motor 14 if desired.

In the operation of the apparatus, water and other liquid containing more or less solid substances, enter the trap 2 through the inlet pipe 1, and the water and other liquid rise, around the lower end of the baffle $2^b$, rise in the pipe 22, and flow to the pump 12, through the pipe 13 and discharge into the chamber 9. The more solid substances fall to the bottom of the portion $a$, of the collection chamber $2^a$ of the trap and remain there temporarily, and the less solid substances float to the top of the chamber 2ª. During this portion of the operation of the apparatus the pump is quiescent but when the level of the water in the tank or reservoir 9 reaches a predetermined high level, the float 11 has been carried up sufficiently to close the switch 15, thereby closing the electric circuit through the electric motor 14 and thereby starting the pump. While the pump is operating, the liquid contained in the tank or reservoir 9 is pumped back through the pipes 13, 22 and into the passage $b$, of the trap or collection receptacle 2. Inasmuch as the check valve 5 is closed against a return flow, the water entering through the passage $b$, flushes out the main chamber, $a$, of the trap and discharges the contents through the check valve 26 and out through the discharge pipe 25. As soon as the water level of the tank or reservoir 9 reaches its predetermined low level the switch is again opened, the motor and pump stopped, and the sewage water flows into the trap 2, the liquids flowing through the pipe 22, pump 12, pipe 13, and into the tank or reservoir 9 as before, the more or less solid substances being deposited in the main chamber, $a$, of the trap. This operation is carried on indefinitely.

From the above it will be readily apparent that the more or less solid substances which are contained in the sewage water, are kept from entering the pump, thereby preventing clogging of the same and doing damage thereto, and furthermore that the liquids that do pass through the pump are utilized for flushing the trap which collects said more or less solid substances.

While the apparatus has been shown and described in connection with the sewage pumping apparatus it is to be understood that its use is not limited thereto as it may be employed in other situations where it is necessary to pump liquids containing more or less solid substances.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. In pumping apparatus for pumping liquids containing more or less solid substances, the combination of a separator having an inlet opening arranged to be connected to the source of liquid supply, and a discharge opening arranged to be connected to a discharge pipe, said separator having also an outlet opening and a baffle between said inlet and outlet openings extending part way down from the top of the separator to leave a substantially U-shaped passage, on the bottom of which solid substances are deposited while the liquid is free to flow to and from said outlet opening, a liquid receiving chamber, an intermittently operated pump, having an intake side connected to said liquid receiving chamber, and a discharge side connected to said outlet opening of the separator.

2. In a pumping apparatus for pumping liquids containing more or less solid substances, the combination of a separator trap, having an inlet opening at its upper end arranged for connection with the source of liquid supply and a discharge opening arranged for connection with a discharge pipe, said separator trap having also an outlet opening at its upper end, to and from which liquids may flow from the interior of the trap, a liquid receiving chamber, an intermittently operated pump, having an intake side connected to said chamber, and a discharge side connected to said outlet opening of the separator trap.

3. In pumping apparatus for pumping liquids containing more or less solid substances, the combination of a separator having an inlet opening arranged to be connected to the source of liquid supply, and a discharge opening arranged to be connected to a discharge pipe, said separator having also an outlet opening and a baffle between said inlet and outlet openings extending part way down from the top of the separator to leave a substantially U-shaped passage, on the bottom of which solid substances are deposited while the liquid is free to flow to and from said outlet opening, a liquid receiving chamber, an intermittently operated pump, having an intake side connected to said liquid receiving chamber, and a discharge side connected to said outlet opening of the separator, and switch mechanism for opening and closing the circuit to the motor, said switch mechanism being actuated by the rise and fall of liquid in said chamber.

4. In pumping apparatus for pumping liquids containing more or less solid substances, the combination of a separator having an inlet opening arranged to be connected to the source of liquid supply, and a discharge opening arranged to be connected to a discharge pipe, said separator having also an outlet opening and a baffle between said inlet and outlet openings extending part way down from the top of the separator to leave a substantially U-shaped passage, on the bottom of which solid substances are deposited while the liquid is free to flow to and from said outlet opening, a liquid receiving chamber, an intermittently operated pump, having an intake side connected to said liquid receiving chamber, and a discharge side connected to said outlet opening of the separator, and a float operated switch mechanism for opening and closing the circuit to the motor, the float of said switch mechanism being actuated by the rise and fall of liquid in said chamber.

5. In a pumping apparatus for pumping liquids containing more or less solid substances, the combination of a separator trap, having an inlet opening at its upper end arranged for connection with a source of liquid supply and a discharge opening arranged for connection with a discharge pipe, said separator trap having also an outlet opening at its upper end, to and from which liquids may flow from the interior of the trap, a liquid receiving chamber, an intermittently operated pump, having an intake side connected to said chamber, and a discharge side connected to said outlet opening of the separator trap, and switch mechanism for opening and closing the circuit to the motor, said switch mechanism being actuated by the rise and fall of liquid in said chamber.

6. In a pumping apparatus for pumping liquids containing more or less solid substances, the combination of a separator trap, having an inlet opening at its upper end arranged for connection with the source of liquid supply and a discharge opening arranged for connection with a discharge pipe, said separator trap having also an outlet opening at its upper end, to and from which liquids may flow from the interior of the trap, a liquid receiving chamber, an intermittently operated pump, having an intake side connected to said chamber, and a discharge side connected to said outlet opening of the separator trap, and a float operated switch mechanism for opening and closing the circuit to the motor, the float of said switch mechanism being actuated by the rise and fall of liquid in said chamber.

7. In apparatus for pumping liquids containing more or less solid substances, a separating device comprising a chambered case, having an inlet opening and a discharge opening at one side and an outlet opening at the other side, and a baffle interposed between said outlet opening and the inlet and discharge openings and projecting part way down from the top of said case.

8. In apparatus for pumping liquids containing more or less solid substances, a separating device comprising a chambered case, having an inlet opening and a discharge opening at one side and an outlet opening at the other side, and means for separating the solid substances from the liquid by gravity.

AUGUSTUS C. DURDIN, Jr.